S. R. PAYNE.
TRAP.
APPLICATION FILED NOV. 26, 1920.
1,387,735.
Patented Aug. 16, 1921.
2 SHEETS—SHEET 2.
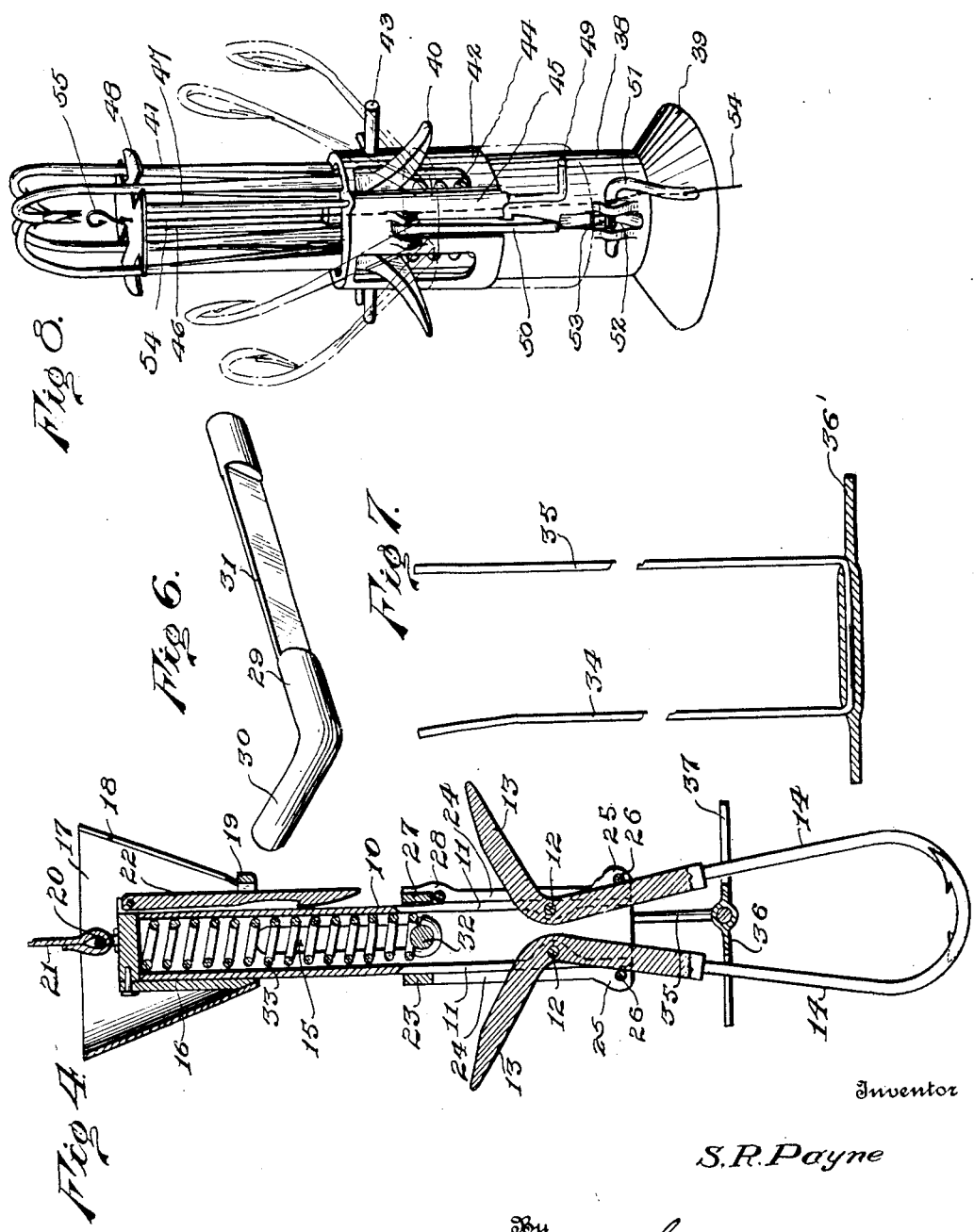
Inventor
S. R. Payne
By
Lloyd Lacey, Attorneys

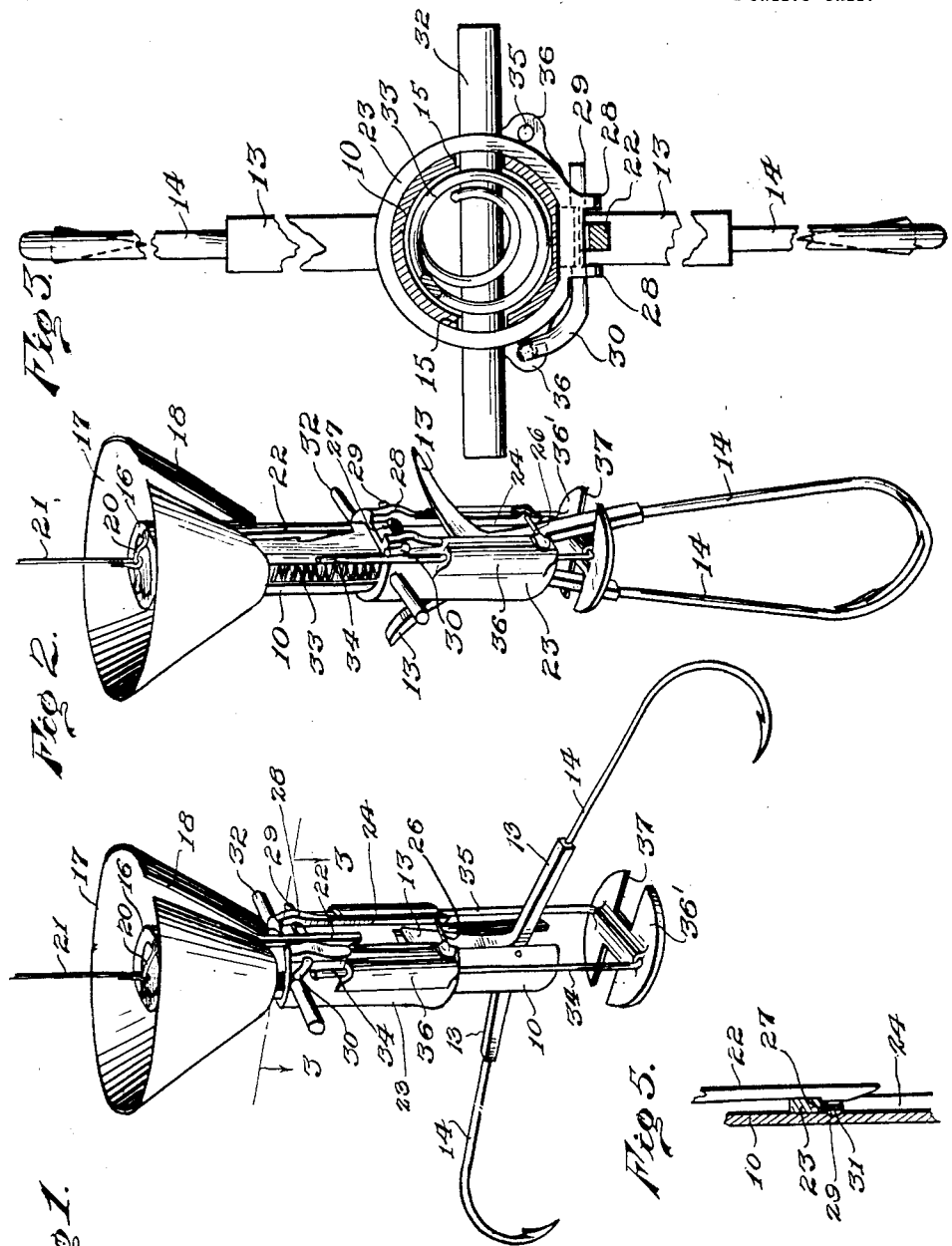

UNITED STATES PATENT OFFICE.

SAMUEL R. PAYNE, OF OXFORD, KANSAS.

TRAP.

1,387,735.  Specification of Letters Patent.  Patented Aug. 16, 1921.

Application filed November 26, 1920. Serial No. 426,536.

*To all whom it may concern:*

Be it known that I, SAMUEL R. PAYNE, citizen of the United States, residing at Oxford, in the county of Sumner and State of Kansas, have invented certain new and useful Improvements in Traps, of which the following is a specification.

This invention relates to an improved trap and has as one of its principal objects to provide a device of this character which may be employed for catching fur bearing animals or rodents while, when desired, the trap may be used for catching frogs.

A further object of the invention is to provide a trap which may be sprung by impact of the trap against the animal to be caught so that after the trap has been set, it may be manipulated at the end of a line.

And the invention has as a still further object to provide a trap which will be characterized by structural simplicity and which will effectually hold an animal caught thereby.

Other and incidental objects will appear hereinafter.

In the drawings:

Figure 1 is a perspective view showing my improved trap set,

Fig. 2 is a view similar to Fig. 1, showing the trap sprung,

Fig. 3 is a transverse sectional view taken on the line 3—3 of Fig. 1, looking in the direction of the arrows, Fig. 4 is a vertical sectional view taken medially through the device, Fig. 5 is a detail section showing the manner in which the catch employed holds the trap set.

Fig. 6 is a perspective view of the trip lever employed,

Fig. 7 is a sectional view showing the tripping member employed, and

Fig. 8 is a perspective view illustrating a slightly modified form of trap, the trap being shown set.

In carrying the invention into effect, my improved trap is formed with a tubular body or barrel 10 provided in its lower end portion with oppositely disposed slots 11. Extending between the side walls of these slots are pivot pins 12 and mounted upon said pins are bell cranks 13 from the lower ends of which project coacting jaws 14. As shown in the drawings, the jaws may be integral with the bell cranks and preferably, said jaws are in the nature of ordinary fish hooks, the lower end portions of the hooks overlapping when the jaws are closed. Formed in the upper end portion of the barrel at substantially right angles to the slots 11 are oppositely disposed slots 15 and fitting over the upper end of the barrel is a cap 16 from the lower end of which extends a frusto-conical base flange 17 provided at one side with a slot 18 at the lower end of which is a keeper 19. The cap carries an eye 20 to which may be secured a line, as conventionally shown at 21. Thus, the trap may, if desired, be set in an inverted position resting upon the base flange 17, the line 21 being arranged to extend through the slot 18 in said flange. Formed in one side of the cap is a longitudinal slot in which freely fits a catch 22 extending through the keeper 19 and pivoted at its upper end upon the upper end wall of the cap. Slidable longitudinally upon the barrel 10 is a jaw actuating sleeve 23 provided in opposite sides thereof with slots 24 registering with the slots 11 of the barred and freely receiving the uppermost arms of the bell cranks 13 therethrough. At the lower ends of said slots are pairs of oppositely disposed ears 25 and extending between said pairs of ears are cross pins 26. The upper end wall of one of the slots 24 defines a shoulder which, for convenience, has been indicated at 27 and below this shoulder the sleeve 23 is provided with ears 28 through which is journaled a trip lever 29 provided at one end with a laterally directed arm 30. As particularly shown in Figs. 5 and 6 of the drawings, said lever is provided with a reduced intermediate portion 31 having flat sides, this reduced portion lying below the shoulder 27 and, when the arm 30 is swung to a transverse position, as shown in Fig. 1, exposing the outer margin of the shoulder. Extending through the sleeve 23 and freely through the slots 15 of the barrel, is a cross pin 32 secured to said sleeve and bearing between the cross pin and the cap 16 of the barrel is a spring 33 acting to project the sleeve downwardly upon the barrel, the pin being adapted to engage the lower end walls of said slots for limiting the sleeve in its downward movement. Mounted upon said sleeve is a tripping member shown in detail in Fig. 7 of the drawings. As will be observed, this member includes a substantially U-shaped frame, the sides of which provide parallel side rods 34 and 35. Upon the sides of the sleeve are formed vertical guides 36 which slidably receive the rods therethrough and it is now to be noted that the upper end portion of the rod 34 is deflected laterally to engage the arm 30 of the trip lever 29 therebeneath. Suitably secured upon the bight of the frame of the tripping member is a preferably annular head 36' and formed in this head are suitable slots 37 for freely receiving the jaws 14.

As will now be readily understood in view of the preceding description, the cross pin 32 may be grasped for retracting the sleeve 23 upon the barrel 10 when, by properly setting the trip lever 29, as shown in Fig. 1, the catch 22 may, as illustrated in Fig. 5, be engaged with the shoulder 27 of the sleeve for holding the sleeve retracted, the tripping member being moved downwardly upon the sleeve so that the upper end of the rod 34 of said member will lie below the arm 30 of said lever. As will, of course, be understood, upward movement of the sleeve upon the barrel will cause the pins 26 upon the sleeve to coact with the uppermost arms of the bell cranks 13 for swinging the jaws to open position so that, as shown in Fig. 1, the trap will be set. Assuming now that by proper manipulation of the line 21, the trap is dropped against a frog to be caught, it will be seen that impact of the tripping member with the frog will serve to move this member upwardly upon the sleeve 23 so that the rod 34 will engage the arm 30 of the trip lever 29, causing this lever to be rotated. The reduced portion 31 of the lever will thus be moved against the lower end portion of the catch 22 so that the catch will be shifted out of engagement with the shoulder 27 of the sleeve. Consequently, the sleeve will be released when the spring 33 will immediately act to move said sleeve downwardly and bring the pins 26 into engagement with the lowermost arms of the bell cranks 13 and forcibly close the jaws 14 against the frog.

In Fig. 8 of the drawings, I have shown a slight modification of the invention, particularly adapting the trap for catching rodents or larger animals. In this modification, a barrel 38 is employed, this barrel corresponding to the barrel 10 of the preferred construction and provided with a base flange 39 adapted to support the trap in upright position. Pivoted upon the barrel is a plurality of bell cranks 40, preferably four in number. These bell cranks are elongated to form jaws 41 corresponding to the jaws 14 of the preferred construction. Mounted upon the barrel is a jaw actuating sleeve 42 slotted to receive the short arms of the bell cranks therethrough and slidably connecting said sleeve with the barrel is a cross pin 43 against which acts a spring 44 corresponding to the spring 33 of the preferred construction. At opposite sides thereof the sleeve is formed with vertical guides 45 and slidable through said guides are the rods 46 and 47 of the trip member 48, notched to freely receive the jaws 41. At its free end the rod 47 is provided with a laterally directed terminal 49. Pivoted upon the sleeve is a catch 50 corresponding to the catch 22 of the preferred construction and mounted to rock upon the barrel 38 is a trip lever 51 substantially identical with the trip lever 30, the trip lever 51 being provided with a reduced portion 52. At one side of the lever, the barrel is formed with a shoulder 53 engageable by the catch 50 for securing the sleeve retracted and holding the trap set, the terminal 49 of the rod 47 of the trip member being engageable with the laterally directed arm of the trip lever for rocking the lever and disengaging the catch from said shoulder. When this occurs, the sleeve 42 will, of course, be projected by the spring 44 for closing the jaws 41. The position of the jaws, when the trip is set, is shown in dotted lines. Threaded through the laterally directed arm of the trip lever and through the barrel 38 is a line 54 carried upwardly through the barrel and through the trip member 48, being equipped with a bait hook 55. Thus, the trap may be easily baited by means of this hook and, as will be seen, pull upon the bait carried by the hook will serve to rock the trip lever and spring the trap so that even should an animal fail to depress the trip member so that the terminal 49 of the rod 47 of said member would be moved to engage the arm of the trip lever, the trip lever would, nevertheless, be actuated for releasing the jaws of the trap.

Having thus described the invention, what is claimed as new is:

1. A trap including a body member, bell cranks pivoted thereon and carrying jaws, a spring pressed sleeve slidable upon said member and having means to coact with the bell cranks for opening and closing said jaws, a catch upon the body member to coact with the sleeve for holding the jaws open, a trip lever for releasing the catch, and a tripping member shiftable to actuate said lever.

2. A trap including a body member, bell cranks pivoted thereon and carrying jaws, a spring pressed sleeve slidable upon said member and having means to coact with the bell cranks for opening and closing said jaws, a catch upon the body member to coact with the sleeve for holding the jaws open, a trip lever for releasing the catch, and a tripping member shiftable to actuate said lever, the tripping member projecting between the jaws.

3. A trap including a body member, bell cranks pivoted thereon and carrying jaws, a spring pressed sleeve slidable upon said member and having means to coact with the bell cranks for opening and closing said jaws, a catch upon the body member to coact with the sleeve for holding the jaws open, a trip lever rotatable upon the sleeve for releasing the catch, and a tripping member slidable upon the sleeve for rotating said lever.

4. A trap including a body member, bell cranks pivoted thereon and carrying jaws, a spring pressed sleeve slidable upon said member and having means to coact with the bell cranks for opening and closing said jaws, a catch upon the body member to coact with the sleeve for holding the jaws open, a trip lever rotatable upon the sleeve for releasing the catch and provided with a laterally directed arm, and a tripping member projecting between the jaws and having side rods slidable upon the sleeve, one of said rods being engageable with said arm for rotating said lever.

5. A trap including a body member, bell cranks pivoted thereon and carrying jaws, a spring pressed sleeve slidable upon said member and having means to coact with the bell cranks for opening and closing said jaws, the sleeve being provided with a shoulder, a catch upon the body member to coact with said shoulder for holding the sleeve retracted and maintaining the jaws open, means rotatable upon the sleeve for riding the catch out of engagement with said shoulder and releasing the sleeve, and means reciprocable upon the sleeve for rotating the first means.

6. A trap including a body member, bell cranks pivoted thereon and carrying jaws, a spring pressed sleeve slidable upon said member and having means to coact with the bell cranks for opening and closing said jaws, the sleeve being provided with a shoulder, a catch upon the body member to coact with said shoulder for holding the sleeve retracted and maintaining the jaws open, a trip lever rotatable upon the sleeve and having a reduced portion lying adjacent said shoulder, the lever being movable to one position whereby its reduced portion will expose a portion of said shoulder and being rotatable whereby said reduced portion will ride the catch out of engagement with the shoulder for releasing the sleeve, and means reciprocable upon the sleeve for rotating said lever.

7. A trap including a body member, bell cranks pivoted thereon and carrying jaws, a spring pressed sleeve slidable upon said member and having means to coact with the bell cranks for opening and closing the jaws, a catch upon the member to coact with the sleeve for holding the jaws open, means rotatable upon the sleeve for releasing the catch, guides carried by the sleeve, a tripping member having a substantially U-shaped frame providing side rods slidable through said guides, and a head carried by the frame between the jaws, one of said side rods being movable for rotating said means.

8. A trap including a barrel provided at its lower end portion with slots, bell cranks pivoted in said slots and carrying jaws, a sleeve slidable upon the barrel and provided with slots to receive the uppermost of the arms of the bell cranks therethrough, pins extending across the slots in the sleeve to coact with the bell crank arms for opening and closing the jaws, the barrel being provided with slots at its upper end portion, a cross pin carried by the sleeve to extend through said last mentioned slots, a spring within the barrel acting against said pin for projecting the sleeve and closing the jaws, a catch upon the barrel to coact with the sleeve for holding the sleeve retracted and maintaining the jaws open, means rotatable upon the sleeve for releasing the catch, and means reciprocable upon the sleeve for actuating the first means.

In testimony whereof I affix my signature.

SAMUEL R. PAYNE. [L. S.]